J. ELLES.
BEET TOPPER.
APPLICATION FILED MAR. 21, 1918.

1,297,666.

Patented Mar. 18, 1919.

Inventor
John Elles

Attorney

UNITED STATES PATENT OFFICE.

JOHN ELLES, OF WARREN, OHIO.

BEET-TOPPER.

1,297,666.

Specification of Letters Patent.   Patented Mar. 18, 1919.

Application filed March 21, 1918.   Serial No. 223,753.

*To all whom it may concern:*

Be it known that I, JOHN ELLES, a subject of the King of Hungary, residing at Warren, county of Trumbull, and State of Ohio, have invented certain new and useful Improvements in Beet-Toppers, of which the following is a specification.

This invention relates to improvements in agricultural implements and particularly to types used in clipping the leaves or tops of vegetables of the bulbous varieties preparatory to their removal from the soil.

The principal object of the invention is to provide means in which the leaves or tops are severed from the bulb without damage to the latter, the device being operable by any convenient source of power, as horses or like draft animals.

A further object is to provide a beet topper which may be operated in a particularly easy and convenient manner and which effectively fulfils its functions.

These and other like objects are attained by the novel construction and combination of parts hereinafter described and shown in the accompanying drawing, forming a material part of this specification, and in which:—

Figure 1:
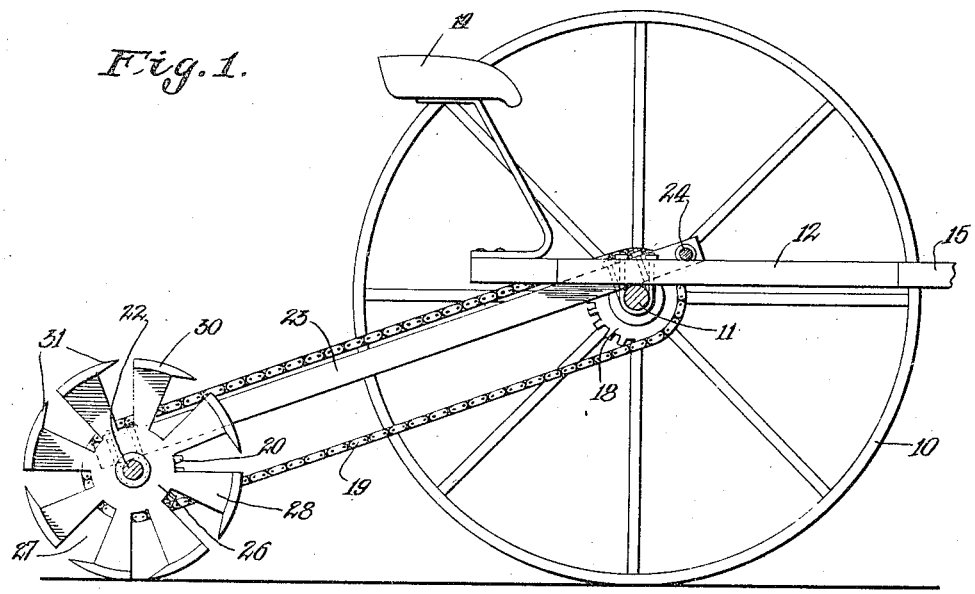
Figure 1 is a vertical sectional view taken on line 1—1 of Fig. 2.
Figure 2:
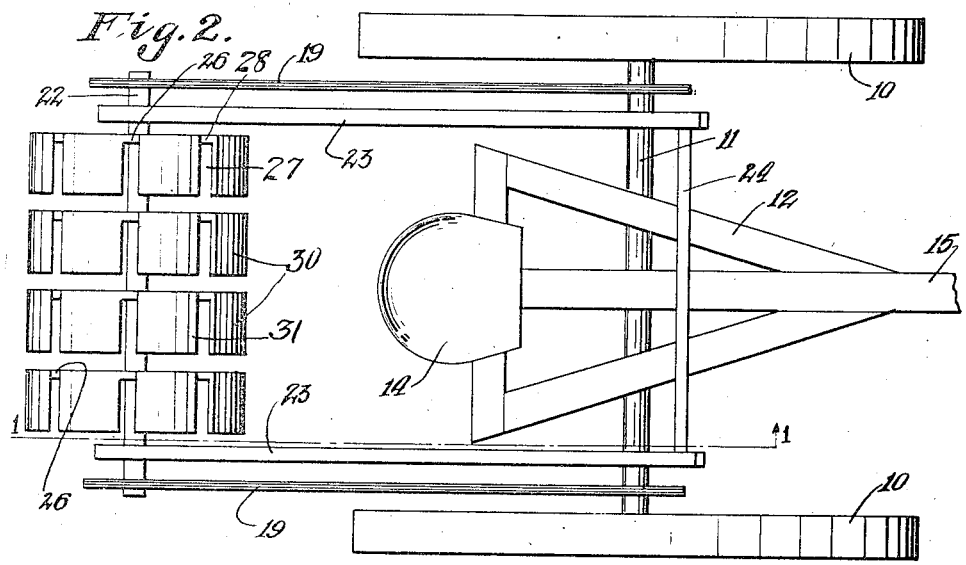
Fig. 2 is a top plan view, showing the operative parts of an implement made in accordance with the invention.

Mounted in a pair of wheels 10, is an axle 11, to which is attached a platform 12, carrying the driver's seat 14, and with which is engaged the pole 15 by which the implement is drawn over the surface.

Secured upon opposite sides of the axle 11, adjacent to the wheels 10, are sprockets 18, communicating motion through chains 19, to other sprockets 20, fixed near the ends of an axle 22, the axle being housed in bearings carried by a frame comprised of two parallel bars 23, the front ends of which are engaged by a transverse rod 24, and are mounted over the axle 11.

Secured at spaced intervals upon the rear axle 22, are a plurality of cutter heads 26 composed of a circular plate in which are formed recesses 27, the remaining portions 28, acting as segmental spokes and having formed with them the cutter blades 30 extending laterally from the sides of the circular plates or disks, having beveled knife-like front edges 31, adapted to sever the leaves or tops of the vegetables as the implement is drawn over them, and it will be obvious that the cutter heads due to their being of less diameter than the driving wheels, will rotate at a greater speed, causing the blades to act in the manner as shears with respect to the leaves or tops of the vegetables, while the weight of the rear axle, together with the attached parts, is sufficient to maintain the cutters in proper proximity to the vegetables.

Having thus described my invention and set forth the manner of its application and use what I claim as new and desire to secure by Letters Patent, is.

1. In a beet topper, the combination with a wheeled truck, an axle, and means for attaching draft animals to said truck, of a pair of parallel rails pivotally engaged with the axle of said truck, and extending rearwardly thereof, a second axle journaled at the rear ends of said rails, means for communicating rotary motion from the first named axle to the second named axle, a plurality of cutter heads at spaced intervals rigidly engaged upon said second axle and of lesser diameter than the truck wheels, said cutter heads consisting of disks rectangularly notched in a direction radial to said axles, and a curved blade formed at the peripheries of said disks integrally therewith, said cutter blades extending as flanges laterally outward from the sides of said disks and over the side edges thereof to form sharp points and arranged circularly thereabout, and beveled, knife-like front edges formed with said blades.

2. In a beet topper, the combination with a truck having an axle rigidly engaged to the wheels thereof, of a pair of support bars pivotally engaged with said axle, said bars extending rearwardly and downwardly, a second axle journaled at the ends of said support bars, means for communicating rotary motion to said second axle from said truck, a plurality of cutter heads of lesser diameter than the truck wheels rigidly engaged upon said second axle at spaced intervals, each of said cutter heads comprising a circular disk having radial rectangularly shaped recesses formed therein, cutters extending at right angles from one side of the solid portion of said disk, and flange like knives formed upon the advancing edge of each of said cutters integrally therewith, and extending over the side edges thereof for forming sharp points, and beveled, knife-like front edges formed with said knives, whereby upon being rotated they are caused to operatively engage with the leaves of the plants over which the truck is advanced, said cutter heads rotating at a greater speed than the truck wheels, and being maintained in proper proximity to the vegetables by the weight of the rear axle.

In testimony whereof I have affixed my signature.

JOHN ELLES.